(No Model.)

M. C. BULLOCK.
DRILL TUBE COUPLING.

No. 430,617. Patented June 24, 1890.

Witnesses:—
Louis M. Y. Whitehead.
Chas. A. Loring.

Inventor:—
Milan C. Bullock.
by Dayton & Poole
Attorneys:—

UNITED STATES PATENT OFFICE.

MILAN C. BULLOCK, OF CHICAGO, ILLINOIS.

DRILL-TUBE COUPLING.

SPECIFICATION forming part of Letters Patent No. 430,617, dated June 24, 1890.

Application filed February 28, 1887. Serial No. 229,072. (No model.)

*To all whom it may concern:*

Be it known that I, MILAN C. BULLOCK, of Chicago, in the county of Cook and State of Illinois, have invented certain new and useful Improvements in Couplings for Tubular Drill-Rods; and I do hereby declare that the following is a full, clear, and exact description thereof, reference being had to the accompanying drawings, and to the letters of reference marked thereon, which form a part of this specification.

In the construction of drill-tubes or tubular drill-rods for rock-drilling it is desirable to use as light tubing as possible in order to avoid great weight in the tube when it is of considerable length. Much difficulty has been experienced in making couplings for uniting the sections of such tubing which will stand the enormous strain of use when the tube is of great length, and which will not be liable to give out and leave a part of the tube in the hole. One construction heretofore used to some extent for this purpose consists of a bushing wholly inserted and welded in the end of the tube and interiorly threaded to receive the exteriorly-threaded member of the coupling. This bushing is necessarily made but little thicker than the depth of the thread cut therein, in order to give suitable diameter to the entering member, and when so thin it is found to be liable to strip out of the tube under heavy strain.

This invention has for its object to provide a coupling which possesses the requisite strength at all points, and which permits the use of lighter pipe than has heretofore been employed in these tubes.

To this end it consists, primarily, in making the interiorly-threaded member of the full diameter of the tube for a greater length than the same is recessed to receive the entering member and in lap-welding an inner extension thereof securely to the tube. The weld is therefore not opposite the thread, so that while the weld may be made as extended and as securely as necessary the threaded recess may be made of large diameter and at the same time with metal enough around it to give adequate strength.

The invention consists, also, in the combination, with such a receiving member as above described, of an entering or externally-threaded member which is lap-welded to the tube.

Figure 1:
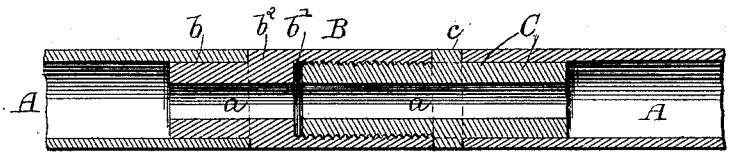
Figure 2:
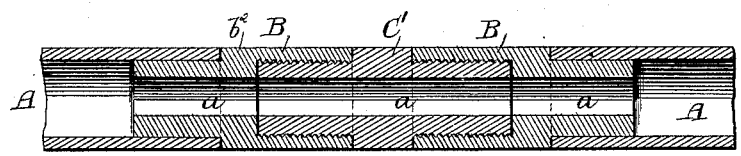
Figure 3:
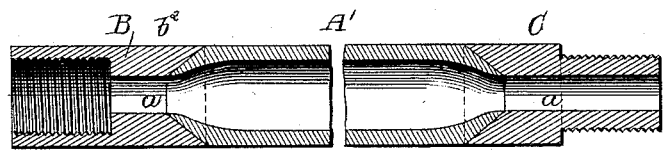
Figure 4:
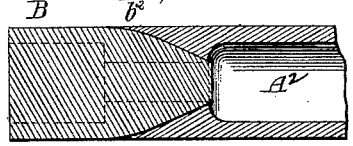
Figure 5:
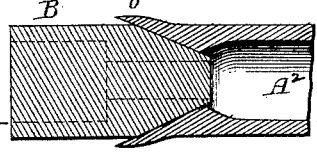

Referring to the accompanying drawings for illustrations of my invention, Figure 1 is a central longitudinal section of two sections of tubing connected by one form of my improved coupling. Fig. 2 is a similar view of a modified form of the coupling. Fig. 3 is an illustration in similar view of another form of lap-weld; and Figs. 4 and 5 illustrate a reversal of the form of lap-weld shown in Fig. 3, the former or Fig. 4 when finished and the latter or Fig. 5 showing the weld partly made.

A A represent sections of tubing, which, instead of being of the extraordinary thickness commonly used in rock-drill tubes, may be of ordinary or what is known as "extra-heavy" gas-pipe.

B is a receiving member of a coupling, which is of the full external diameter of the tube A and forms an extension thereof. Said receiving member of the coupling is lap-welded to the tube, and in its outer end is recessed and interiorly threaded to receive the entering member C of said coupling.

As shown in Figs. 1 and 2, the receiving member B of the coupling is reduced in diameter at $b$ to enter the tube A, which is welded securely upon such reduced portion. In making the lap-weld in this form the reduced part of the member B will be made slightly larger than the normal interior diameter of the tube, and the latter will be expanded slightly by swaging or otherwise to pass over such reduced part $b$, after which and in welding the bar to the tube the latter will be hammered down upon the reduced portion $b$ of the coupling member until the original diameter of the tube is restored, giving a flush or uniform diameter of the tube and coupling member B.

The interiorly-threaded recess $b'$ of the receiving member B terminates some distance outside of the end of the tube A, so that while the interior diameter of said recess may be made nearly or quite the same as that of the tube-section such coupling B is left of great strength at the offset, against which the end of the tube abuts. The thick portion $b^2$, intervening between the inner end of the threaded recess $b'$ and the shoulder of the reduced part $b$, affords a place at which the coupling may be seized by the tongs in joining or separating the pipe-sections without danger of collapse.

C is the entering member of the coupling, externally screw-threaded to fit the threaded recess $b'$ of the receiving member B. In Fig. 1 said entering member C is inserted within the end of the tube-section A and is lap-welded thereto in the manner substantially as described of the receiving member B. The member C may be made for a portion of its length of the full diameter of the tube and shouldered against it, as shown at $c$; or, if desired, it may be without such projection, in which case the end of the tube into which it is welded will abut against the member B when the sections are secured together. The latter construction is indicated by dotted lines, showing the tube A, to which the member C is welded, extending to the screw-threaded part of said member.

In Fig. 1, as above described, the coupling consists of two members only, B and C, each tube-section being provided with one of such members upon one end and the other upon the other end. In Fig. 2 the coupling is shown as consisting of two receiving members B and a detached double-ended entering member C, this being the case when each end of a tube-section A is provided with a receiving member at each end, requiring the insertion of an entering member between them for the purpose of making the junction of such tube-sections.

In Fig. 3 is shown a construction of the lap-weld which is, for some reasons, preferred to the construction of such weld as shown in Figs. 1 and 2. In said Fig. 3 the inner end of the several coupling members attached to the tube-section A is conically recessed to give a longer contact or welding surface with the end of the tube, and the end of the tube is made conical to fit said recess, as indicated. Inasmuch as relatively light pipe or tubing will be used for the sections A, and inasmuch as a long weld is desirable, the length of the welding surface at the end of the tube is increased by contracting the ends of said tube, as shown. The limit of such contraction is the diameter of the hole $a$, which is formed through the axis of each coupling member for the purpose of giving a continuous water-passage through the entire line of tubing after a number of sections have been joined together. In said Fig. 3 a tube-section is shown provided with a receiving and entering member at its opposite ends; but manifestly each end of said section may be provided with a receiving member B, and a double-ended entering member C may be employed to join the tube-sections, as shown in Fig. 2.

In Fig. 4 essentially the same form of lap-weld is shown as in Fig. 3, the inclination of the contact or weld surfaces being simply reversed—that is, the coupling member is conical and the tube is conically recessed. The parts are driven together after the first heat, giving the form to the end of the tube shown in Fig. 5, after which another heat is taken and the overhanging edge of the tube is hammered down till the diameter of the parts is uniform, giving the general direction of the welded surfaces shown in Fig. 4. Preferably the hole $a$ through the end piece or coupling member B will be bored after the tube is welded to said coupling member when the latter is conical, for otherwise the end of the hole $a$ is liable to be contracted in the operation of welding. The heavy body of metal at $b^2$ in the coupling member B of the form shown in Figs. 4 and 5 and embraced by the thinner lapping portion of the end of the tube answers to the part $b^2$ of Figs. 1, 2, and 3 with respect to its strength to resist collapse under compression of the tongs.

It is desirable that the passage $a$ through the coupling shall be as large as practicable in order that free passage may be allowed for water through the coupling. By the use of the externally-flush receiving member B, having a diameter nearly or quite equal to that of the tube-section, it is manifestly practicable to provide a larger passage $a$ through the coupling than there would be room for if the tube were itself interiorly threaded, or if the tube were provided with an interior bushing, in which said thread were cut, since the entering member in the construction shown has a larger diameter, and may therefore have a larger passage without objectionable reduction of its strength.

I claim as my invention—

1. In a coupling for tubes, the combination of an entering member of the coupling reduced in diameter at its entering end, a tube-section, and a receiving member of the coupling lap-welded to the tube-section and having an extension of the same external diameter as the tube, said extension being interiorly enlarged or recessed to receive the entering member.

2. In sectional drill-tubing, the combination, with two tube-sections, of a receiving coupling member lap-welded to one of said tube-sections and having an extension which is of the same external diameter as the tube and is interiorly enlarged or recessed and screw-threaded to receive the entering coupling member, and an entering coupling member, lap-welded to the other tube-section, and reduced in diameter at its entering end and screw-threaded to engage said receiving member.

In testimony that I claim the foregoing as my invention I affix my signature in presence of two witnesses.

MILAN C. BULLOCK.

Witnesses:
M. E. DAYTON,
CHARLES T. LORING.